United States Patent [19]

Foushee

[11] 4,016,731
[45] Apr. 12, 1977

[54] FLEXIBLE COUPLING ASSEMBLY

[75] Inventor: Charles F. Foushee, Fern Creek, Ky.

[73] Assignee: General Electric Company, Louisville, Ky.

[22] Filed: Nov. 20, 1975

[21] Appl. No.: 633,783

[52] U.S. Cl. .................................. 64/15 B; 64/12; 64/27 B

[51] Int. Cl.² .......................................... F16D 3/52

[58] Field of Search ................ 64/12, 19, 11, 15 B, 64/27 B, 13, 15 R; 74/574

[56] References Cited

UNITED STATES PATENTS

| 766,261 | 8/1904 | Jebsen | 64/15 B |
| 2,968,169 | 1/1961 | Davis | 64/15 B |
| 3,611,750 | 10/1971 | Gasior | 64/15 R |

FOREIGN PATENTS OR APPLICATIONS 389,907  3/1933  United Kingdom ............... 64/15 B Primary Examiner—Samuel Scott
Assistant Examiner—Randall Heald
Attorney, Agent, or Firm—Frederick P. Weidner; Francis H. Boos

[57] ABSTRACT

An improved flexible coupling assembly for connecting a driving member to a driven member and includes two spaced circular end plates, one for securing to the driving member and one for securing to the driven member, the end plates being interconnected by a one-piece flexible plastic molded body having a plurality of bowed ribs which compensates for axial and lateral displacement between the end plates.

4 Claims, 4 Drawing Figures

FLEXIBLE COUPLING ASSEMBLY

BACKGROUND OF THE INVENTION

1. Field of the Invention

This invention relates to an improved flexible coupling assembly and more particularly to an improved flexible coupling assembly used in an automatic clothes washing machine.

2. Description of the Prior Art

Automatic clothes washing machines customarily proceed through a sequence of operations or cycles in order to wash, rinse and spin dry clothes. The sequence ordinarily includes a washing operation and a liquid extraction operation. These machines have a stationary tub, a clothes retaining basket, and a vertical axis vaned agitator. During the washing operation the agitator oscillates back and forth while the clothes retaining basket is prevented from movement. This action provides for turning over the clothes in the washing liquid for effecting the wash operation. In the liquid extraction operation the basket and agitator are rotated or spun in unison at high speed to extract liquid from the clothes by centrifugal force. During the washing operation a pump constantly recirculates the washing liquid through a filter to remove lint and other contaminants. During the liquid extraction operation the pump operates to remove the washing liquid from the machine.

It is desirable that all of the aforementioned driven operations be accomplished by a single motor in the machine. To this end there is a transmission for providing oscillation of the agitator during the washing operation and rotation of the basket and agitator during the liquid extraction operation. Usually the transmission is driven by an endless belt which in turn is driven by a reversible electric motor through a clutch mechanism. The connection or coupling between the motor and the pump must be flexible to accommodate the various positions that the motor may assume relative to the pump both axially and laterally. Flexible couplings were provided heretofore, however, they were more expensive to manufacture as they had additional component parts and more difficult to assemble thus increasing the labor costs.

By my invention I have improved the prior art flexible coupling assembly in that I have provided a less expensive coupling assembly with fewer component parts and one that is more easily assembled yet accomplishes the same desirable results.

SUMMARY OF THE INVENTION

This invention relates to an improved flexible coupling assembly for connecting a driving member to a driven member and includes a first circular end plate for attachment to the driving member for rotation therewith and a second circular end plate spaced from the first end plate for attachment to the driven member for rotation therewith, the first and second end plates each having a circular flat surface and at least one lug extending beyond the flat surface. There is provided a one-piece flexible plastic molded body having a collar portion at each end engaging the circular flat surface of the first and second end plates, respectively, and having a notched area to receive the respective lugs. Each of the collar portions has two bosses for receiving fastening means to secure the collars to the first and second end plates respectively. Between and integrally interconnecting the collar portions are a plurality of spaced outwardly bowed ribs. Provided also is a fastening means holding the two bosses of each collar portion together to thereby secure the molded body to the first and second end plates.

DESCRIPTION OF THE PREFERRED EMBODIMENT

Figure 1:
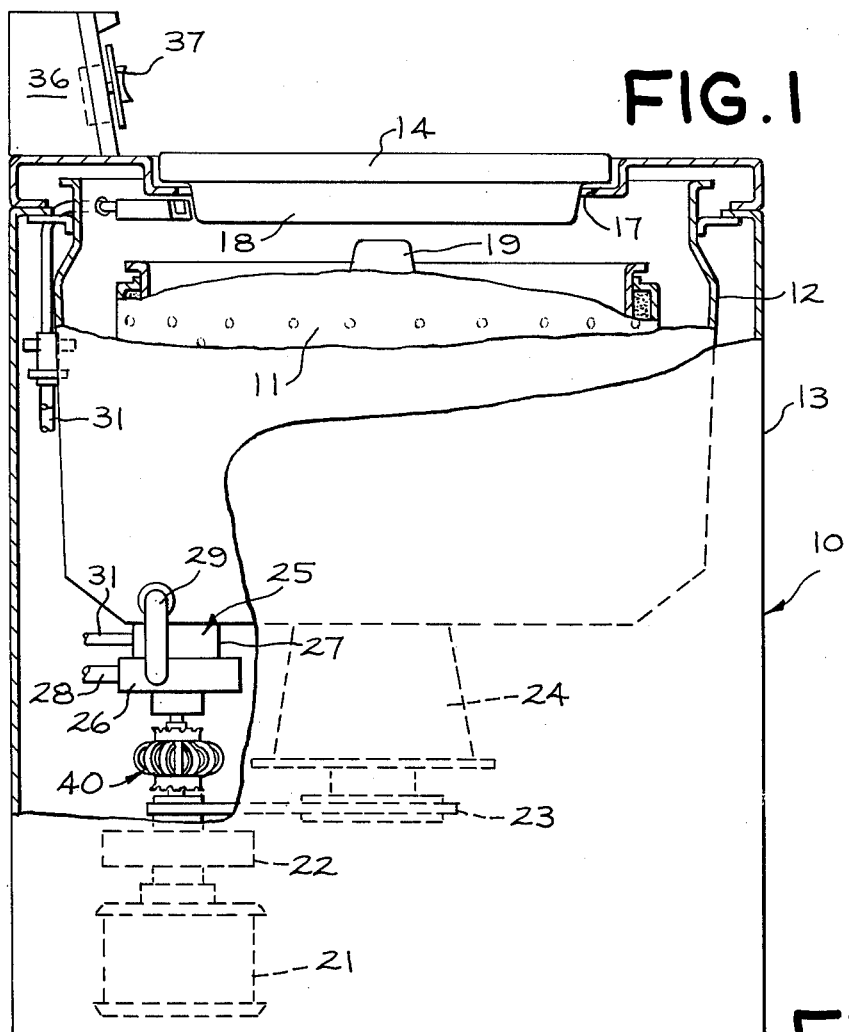
FIG. 1 is a schematic side elevational view of a clothes washing machine incorporating my improved flexible coupling assembly, the view being partly broken away and partly in section.

Referring now to FIG. 1, there is shown a washing machine 10 having a conventional perforated wash basket 11 disposed within an outer imperforate, stationary liquid retaining tub 12. With this combination, the basket 11 and tub 12 form suitable means for containing liquid and the fabrics to be washed in said liquid. The outer tub 12 is rigidly mounted within an appearance cabinet 13 which includes an access cover or lid 14 mounted by hinges (not shown) on the top portion of the cabinet for providing access through an opening 17 to the basket 11.

Shown positioned over the basket 11 and projecting into the opening 17 is a wash water treating agent dispenser 18. At the center of the wash basket 11 there is positioned an agitator 19 which is mounted for oscillatory motion which acts to turn over the fabrics during the washing operation. The basket 11 is mounted for high speed rotation along with the agitator 19 for extracting liquid from the clothes by centrifugal force.

Basket 11 and agitator 19 are driven by a reversible motor 21 through a drive mechanism including a clutch 22 which through a suitable belt 23 transmits power to a transmission 24. When the motor 21 is rotated in one direction the transmission causes a slow speed oscillation of the agitator 19 for the washing operation. Conversely, when the motor is driven in the opposite direction the transmission drives both the basket 11 and agitator 19 in unison at high speed for centrifugal extraction of the liquid from the fabrics within the basket.

In addition to operating the transmission 24 as described, motor 21 also provides a direct drive to a pump mechanism 25 that includes separate pumping units 26 and 27. The flexible coupling assembly 40 of this invention is specifically for use between the motor 21 (driving member) and the pump mechanism 25 (driven member). During the high speed liquid extraction operation, pump unit 26 draws liquid from the outer tub 12 through conduit 29 and discharges it through conduit 28. During the washing operation pump unit 27 draws liquid from the tub and discharges it through conduit 31. Conduit 31 extends up and terminates in the tub wall and directs liquid flow into the dispenser 18 or a filter pan (not shown) and then into the basket 11.

Mounted on the cabinet 13 is a control compartment 36 in which are located control devices, including a cycle controller 37 which conducts the washing machine through cycles of operation.

Figure 2:
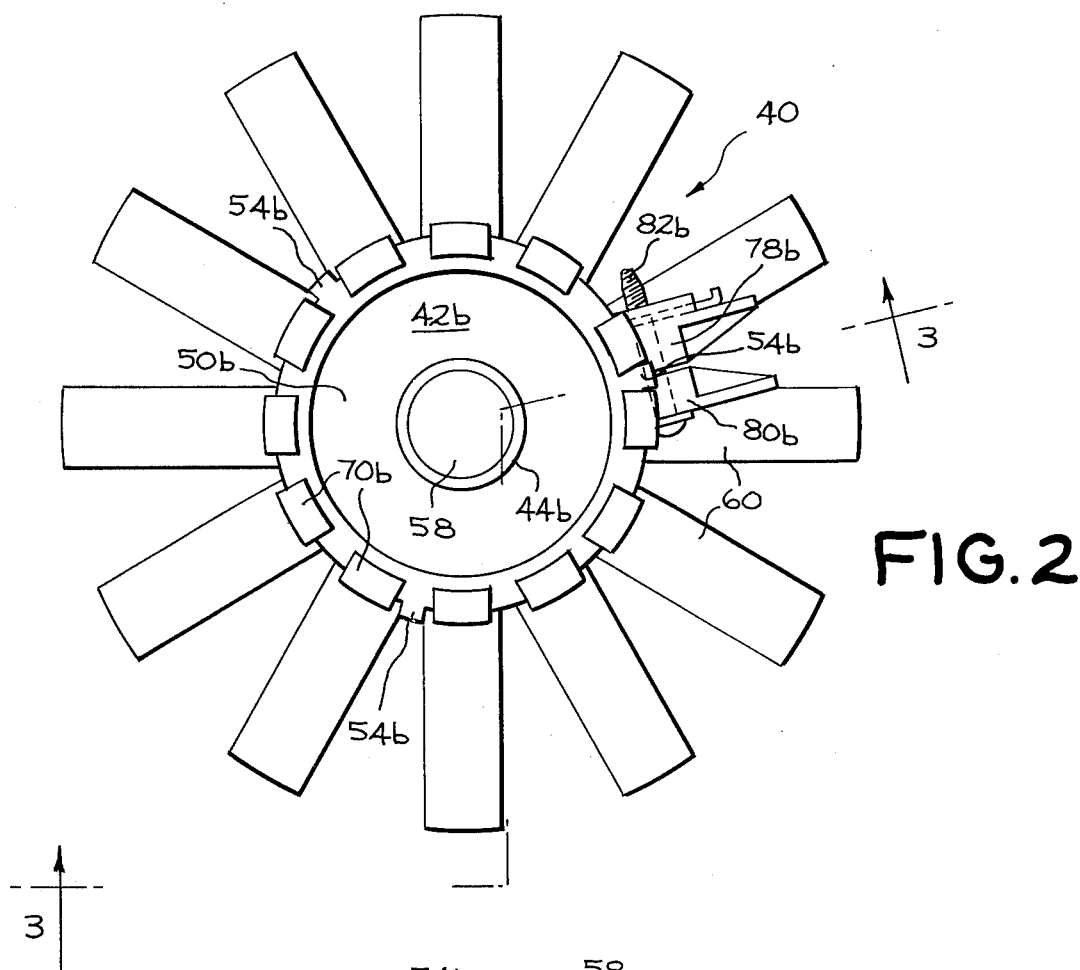
FIG. 2 is a top plan view of the improved flexible coupling assembly.
Figure 3:
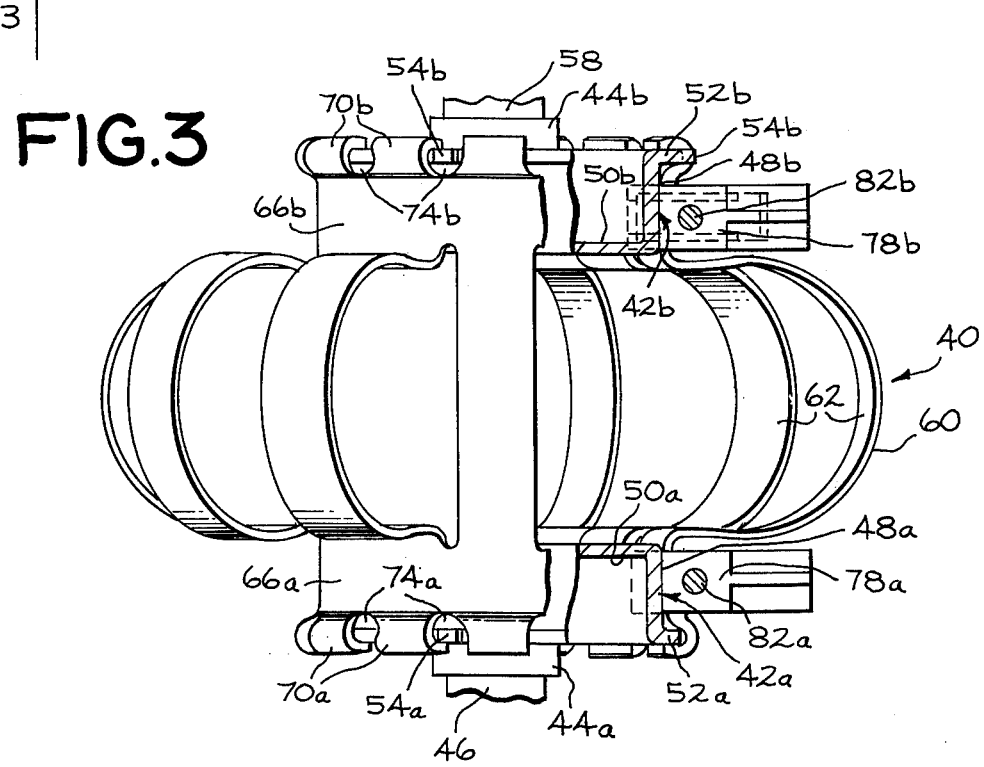
FIG. 3 is a fragmentary sectional view taken along lines 3—3 of FIG. 2.

With reference to FIGS. 2 and 3 in particular, the flexible coupling assembly 40 is shown completely assembled. The flexible coupling assembly 40 includes two identical end plates so the respective components will have the same number identification but with $a$ and $b$ suffixes. The end plates 42a and 42b which may be of cast metal each have a central hub 44a and 44b. Hub 44a is for securement by any suitable means to a driving member 46 such as a shaft or shaft extension of the reversible electric motor 21. Hub 44b of end plate 42b is secured by any suitable means to a driven member 58 such as the rotational central axle of the pump 25. The end plates 42a and b have a circular flat surface or collar portions 48a and 48b at right angles to the horizontal disc portion 50a and 50b that interconnects the circular flat surfaces 48a and 48b and the central hubs 44a and 44b, respectively. The collar portions 48a and 48b terminate in radially outwardly directed flanges 52a and 52b which flanges have further extensions of at least one lug 54a and 54b and preferably three lugs equally spaced around the periphery of flanges 52a and 52b, the function of which will be explained later.

Figure 4:
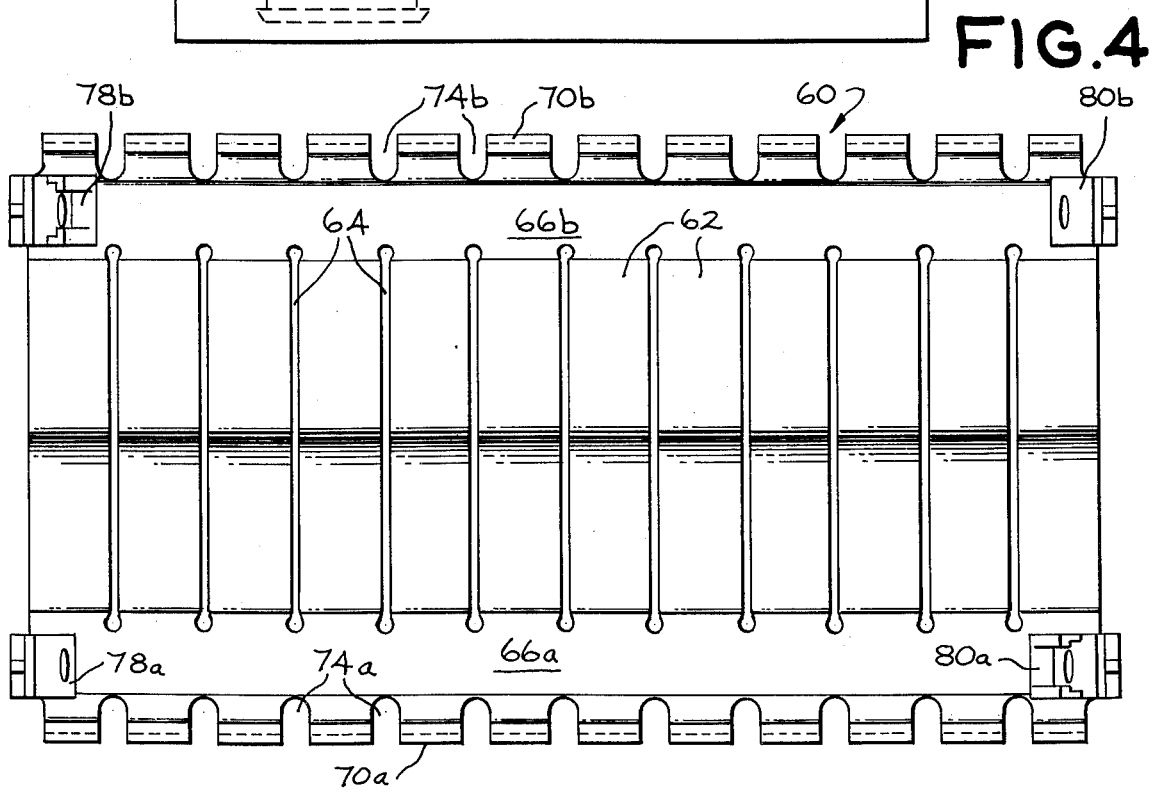
FIG. 4 is a plan view of a portion of the improved flexible coupling assembly.

Interconnecting the first circular end plate 42a and the second circular end plate 42b is a one piece flexible plastic molded body 60 which is shown in its molded form prior to assembly in FIG. 4. The plastic molded body 60 includes a plurality of bowed ribs 62 which are slightly thinner at their middle portion relative to the outer portions. The ribs 62 are provided by making slits 64 in the one piece molded body 60 during its manufacture. Also during manufacture, the mold provides for two flat surfaces 66a and 66b located respectively along each side of the molded body outwardly of the ribs 62. At the longitudinal edges of the plastic molded body there is provided a hook or U-shaped portion 70a and 70b with equally spaced notches 74a and 74b respectively. Also during molding of the one piece plastic molded body 60 the collar portions 66a and 66b are provided at the ends thereof with bosses 78a and 78b at one end and bosses 80a and 80b at the other, which bosses are for receiving fastening means such as screws 82a and 82b therethrough to secure one end of the collars to the other during assembly. Other types of suitable fastening means may be used.

The one piece plastic molded body 60 shown in FIG. 4 and described above is secured to the two circular end plates 42a and 42b by wrapping the flat surfaces 66a and 66b around and in contact with the respective collar portions 48a and 48b while the U-shaped portions 70a and 70b interface with the flanges 52a and 52b. The notches 74a and 74b are provided so that the three equally spaced lugs 54 may be received therein. These lugs then prevent relative motion between the end plates 42a and 42b and the flat surfaces 66a and 66b of the molded plastic body 60.

Either before or after the assembly of the flexible coupling the end plates 42a and 42b are secured respectively to the driving member 46 and the driven member 58. It can be seen that the coupling assembly is quite flexible due to the outwardly bowed ribs 62 located between the end plates 42a and 42b which compensate for any axial displacement between the end plates and also any lateral displacement. By providing the ribs with a thinner center portion the flexing of the molded body primarily occurs in that area thus reducing the strain on the plastic ribs where they join the flat surfaces 66a and 66b.

The foregoing is a description of the preferred embodiment of the invention and variations may be made thereto without departing from the true spirit of the invention, as defined in the appended claims.

What is claimed is:

1. A flexible coupling assembly for connecting a driving member to a driven member comprising:
   a. a first circular end plate for attachment to the driving member for rotation therewith,
   b. a second circular end plate spaced from the first end plate for attachment to the driven member for rotation therewith, said first and second end plates each having a circular flat surface and at least one lug extending beyond the flat surface,
   c. a one-piece flexible plastic molded body having (i) a collar portion at each end engaging the circular flat surface of the first and second end plates respectively, said collar portions each having two bosses for receiving fastening means to secure the collars to the first and second end plates respectively, (ii) a notched area to receive the respective lugs, and (iii) a plurality of spaced outwardly bowed ribs interconnecting the collar portions and spanning the space between the first and second end plates, and
   d. fastening means holding the two bosses of each collar portion together to thereby secure the molded body to the first and second end plates.

2. The flexible coupling assembly of claim 1 wherein there are a plurality of notched areas and lugs.

3. The flexible coupling assembly of claim 1 wherein the middle portion of the bowed ribs are thinner than the outer portions of the ribs.

4. The flexible coupling assembly of claim 1 wherein the circular flat surfaces of the first and second end plates terminate in a radially outwardly directed flange and at least one lug extends therefrom, said plastic molded body having a U-shaped portion along each edge adjacent the end plates to interface with the respective flanges.

* * * * *